United States Patent [19]
Maillard et al.

[11] 3,886,429
[45] May 27, 1975

[54] DIRECT-DIRECT SYMMETRICAL CONVERTER POWER PACK

[75] Inventors: Gilbert Maillard; Jean Morisset, both of Paris, France

[73] Assignee: Thomson—CSF, Paris, France

[22] Filed: Jan. 17, 1974

[21] Appl. No.: 434,304

[30] Foreign Application Priority Data
Jan. 23, 1973 France .................. 73.02270

[52] U.S. Cl. ............. 321/2; 307/23; 307/28; 321/8 R; 331/113 A
[51] Int. Cl. ............................... H02m 3/14
[58] Field of Search ...... 321/2, 8 R, 15; 331/113 A; 325/492; 307/17, 21, 23, 28, 29, 39, 82, 150, 151; 323/43, 55

[56] References Cited
UNITED STATES PATENTS

| | | | |
|---|---|---|---|
| 3,009,115 | 11/1961 | Johnson | 331/113 A |
| 3,012,206 | 12/1961 | Burnside | 331/113 A |
| 3,015,771 | 1/1962 | Mesenhimer | 321/15 |
| 3,119,056 | 1/1964 | Hatke et al. | 321/2 |
| 3,713,018 | 1/1973 | Tscheuschner | 321/15 |

FOREIGN PATENTS OR APPLICATIONS

| | | | |
|---|---|---|---|
| 244,387 | 5/1969 | U.S.S.R. | 331/113 A |
| 760,573 | 6/1967 | Canada | 321/2 |
| 1,007,169 | 10/1965 | United Kingdom | 321/2 |

*Primary Examiner*—William H. Beha, Jr.
*Attorney, Agent, or Firm*—Cushman, Darby & Cushman

[57] ABSTRACT

The converter comprises an autotransformer, four taps of which are respectively connected to one electrode of four transistors. When a direct voltage is applied to one or the other input of the converter, these transistors are alternately, by pairs, blocked and saturated, changing the direction of the current flowing in the winding of the autotransformer. The taps coupled to the four transistors are so chosen that the two inputs of the converter may be used with voltage supplies having two different values, the same converted voltage appearing between the output terminal in both cases. An automatic selector circuit, responsive to the value of the voltage applied to the input of the power pack, automatically connects this input to one or the other input of the converter.

5 Claims, 2 Drawing Figures

DIRECT-DIRECT SYMMETRICAL CONVERTER POWER PACK

The present invention relates to a symmetrical converter power pack, which can be employed in particular in radio equipment intended for installation in vehicles.

In mobile equipment, it is well known to utilise voltage converters to produce the various voltages required for the operation of the equipment from a single direct voltage furnished by a power source which is more often than not constituted by the vehicle storage battery. Known devices of the symmetrical converter type are constituted by a transformer, switching circuits which supply to the primary of this transformer an alternating signal obtained from the direct source voltage, and rectifier circuits connected to the secondary of the transformer. These symmetrical converters are designed to operate with a given voltage source; their supply from a different voltage source, when a change of vehicle is effected for example, is only possible at the expense of radical changes to the electrical connections. This, prior to the application of voltage to the equipment, necessitates selection of circuits by the operator and this is a procedure which can give rise to errors and to damage to the equipment.

Other converters are known, of the "chopper" kind with an energy storage inductor, which do not exhibit these drawbacks. However, in operation they produce pulse-type currents in the source, requiring the introduction of filter devices and complex and expensive devices for eradicating parasitic components.

The object of the present invention is to overcome the aforesaid drawbacks and to make it possible, by means of an improved symmetrical converter, to effect the electrical connection of a portable equipment to power sources of two different kinds, without the need for previous selection operations.

According to the invention, there is provided a symmetrical converter power pack having an input for being coupled to a supply source and comprising: a transformer having a winding with a centre-tap and further taps; at least one rectifier circuit coupled to said transformer, a switching circuit comprising first and second terminals, first, second, third and fourth transistors, each having a control electrode and first and second further electrodes, said first further electrodes of said first and second transistors being coupled to said first terminal, and said second further electrodes of said first and second transistors being symmetrically coupled to said winding relatively to said centre-tap, said first further electrodes of said third and fourth transistors being coupled to said second terminal and said second further electrodes of said third and fourth transistor being symmetrically coupled to said winding relatively to said centre tap, said first terminal and said centre-tap forming a first input of said converter, said first and second terminals forming a second input of said converter; and a selector device for connecting said input of said power pack either to said first input or to said second input of said converter.

The present invention will be better understood and other of its features rendered apparent, from a consideration of the following description and related drawings in which.

Figure 1:
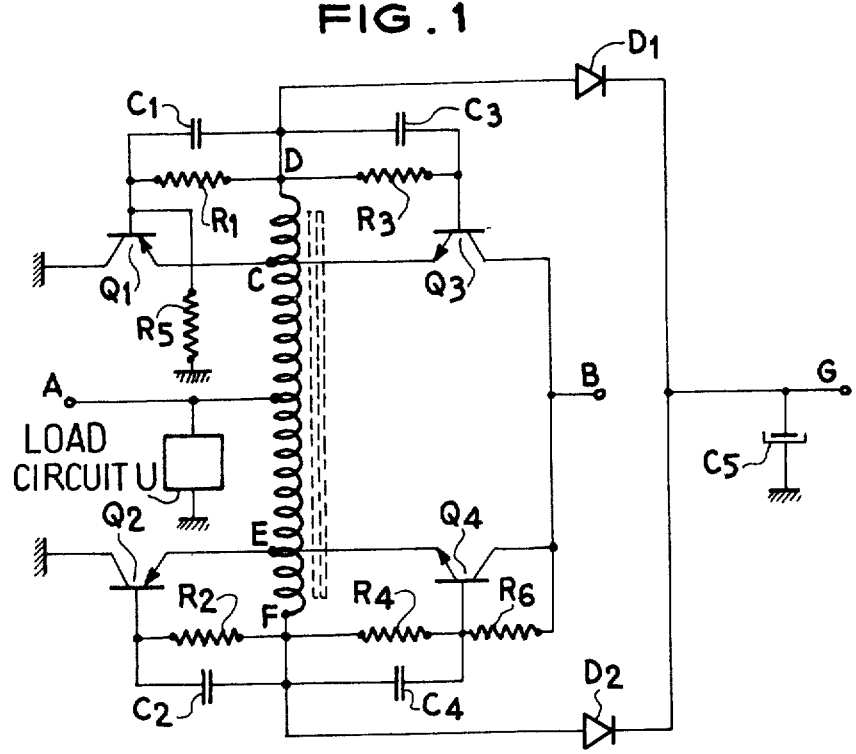
FIG. 1 is a diagram of an embodiment of a symmetrical converter which can operate on 12 V and 24 V batteries.

The symmetrical converter shown in FIG. 1 is designed to provide a direct voltage of around 28 V either from a 12 V battery or from a 24 V battery, the negative terminal of the battery being assumed to be grounded. It comprises an autotransformer with a winding DF possessing a centre-tap, with two intermediate, symmetrical taps C and E such that the transformer ratios are $(CD/CE) = (EF/CE) = (1/5)$. The centre-tap of the primary winding is connected to an input A designed to receive a direct voltage of + 12 V.

The converter also comprises a full-wave rectifier circuit formed by two diodes $D_1$ and $D_2$ respectively arranged between the two end terminals D and F, of the autotransformer, and the positive terminal G of a capacitor $C_5$ whose other terminal is grounded; terminal G is the converter output.

Finally, the converter comprises a double switching circuit; the first part of the circuit is constituted in the conventional way by two identical p-n-p transistors, $Q_1$ and $Q_2$, respectively connected to the taps C and E of the winding DF, by their emitters, and grounded by their collectors. The base of the transistor $Q_1$ is connected to the terminal D through a parallel circuit comprising a resistor $R_1$ and a capacitor $C_1$, and grounded through a resistor $R_5$; the base of the transistor $Q_2$ is connected to the terminal F through a parallel circuit comprising a capacitor $C_2$ and a resistor $R_2$. The second part of the switching circuit is formed by two identical n-p-n transistors $Q_3$ and $Q_4$, the emitters of which are respectively connected to the taps C and E of the winding DF and the collectors of which are connected to a common point B, which is an input designed to receive the direct voltage + 24 V. The base of the transistor $Q_3$ is connected to the terminal D through a parallel circuit comprising a resistor $R_3$ and a capacitor $C_3$; the base of the transistor $Q_4$ is connected to the terminal F through a parallel circuit comprising a resistor $R_4$ and a capacitor $C_4$, and to the input B through a resistor $R_6$.

The operation of the converter is as follows:
If a voltage of + 12 V is applied to the point A, the transistor $Q_1$ is driven into the conductive state, and then becomes saturated because of the unbalance created by the resistor $R_5$; a current develops in the winding of the autotransformer and the induced voltages develop the approximate values hereinafter quoted, in relation to ground:

+ 0.5 V at the point C because of the saturation voltage between emitter and collector of the transistor $Q_1$;
− 4.1 V at the point D;
+ 23.5 V at the point E;
+ 28.1 at the point F, the transformer ratios being selected to this end.

The transistor $Q_1$ is maintained in the saturated state by the negative voltage prevailing between the terminals C and D, the transistor $Q_2$ is blocked by the positive voltage appearing between the terminals E and F, while the transistors $Q_3$ and $Q_4$ are respectively blocked and saturated by these same voltages; the transistors $Q_3$ and $Q_4$ do not play any part because they are connected together by their collectors and are not connected to any other circuit. When the current flowing in the winding reaches a maximum value determined by the characteristics of the autotransformer, the absolute value of the bias voltage at the base of transistors $Q_1$ and $Q_3$ decreases, tending to reduce the current through the part of the circuit formed by transistor $Q_1$, winding CE and transistor $Q_3$. Thus the bias voltage decreases repeatedly further reducing the current. Under these conditions, transistors $Q_1$ and $Q_3$ are speedily blocked and the transistors $Q_2$ and $Q_4$ are driven in the conductive state and become saturated.

The voltages and currents in the autotransformer reverse at this instant, until the next change of state. The rectifier circuit rectifies the alternating voltage which appears between the extreme terminals F and D as a consequence of the repeated changes of state in the switching circuits.

If a direct voltage of 24 V is applied to the input B, the transistors $Q_1$ and $Q_4$ are driven into the conductive state by the resistors $R_5$ and $R_6$; a current flows through the winding CE, inducing across the terminals of the winding sections CD and EF, voltages which maintain the transistors $Q_1$ and $Q_4$ saturated and the transistors $Q_2$ and $Q_3$ blocked. As before, this state is maintained until the instant at which the current reaches the value for which the magnetic circuit becomes saturated, bringing about the change in state of the switching circuits. In the case where the saturation voltages of the transistors are identical, the instantaneous voltages during this half-cycle have the following approximate values in relation to ground:

+ 23.5 V at point E
+ 0.5 V at point C
+ 12 V at point A
− 4.1 V at point D
+ 28.1 V at point F These voltages are the same as in the preceding case and the operation is identical as far as the autotransformer and the rectifier circuit are concerned.

It should be pointed out that if the supplies are effected via the point B from a 24 V source, the point A is permanently maintained at the voltage + 12 V, and that consequently the load circuits, such as that represented by U, normally operating at a supply voltage of 12 V can be permanently connected to the point A.

Due to its structure, this symmetrical converter can easily be associated with an automatic voltage selector circuit; indeed, depending upon the source utilised, it is sufficient to switch a single connection (that linking the positive terminal of the battery to one of the inputs A and B in the case shown in FIG. 1), to obtain the circuit appropriate for the considered source, and this can be achieved by means of a simple selecting circuit.

Figure 2:
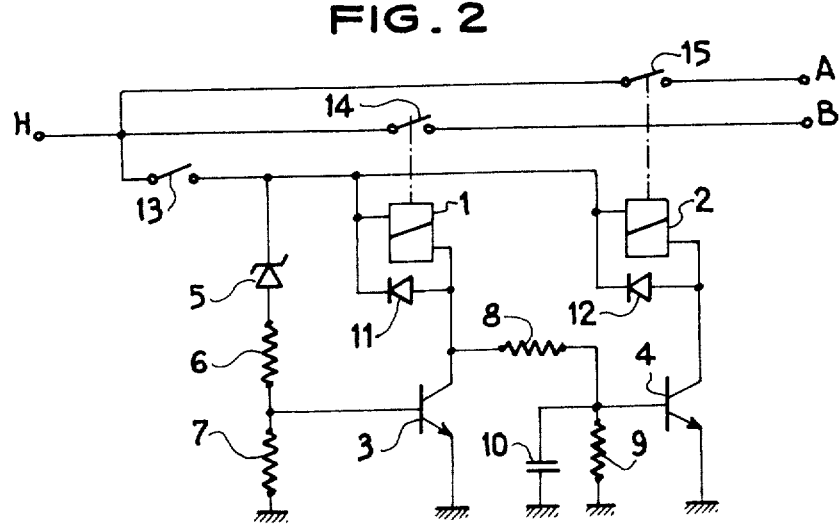
FIG. 2 is the diagram of a simple embodiment of an automatic voltage selector circuit which can be utilised with the converter of FIG. 1.

FIG. 2 provides a diagram of a selecting circuit of this kind. The circuit has an input H designed for connection to the positive terminal of the source, and two outputs A and B designed to be connected to the corresponding inputs of the converter. A switch 13 for applying the voltage, links the input H to two channels respectively formed by the control windings of relays 1 or 2 connected to the collectors of corresponding n-p-n transistors, 3 or 4, whose emitters are grounded. The base of the transistor 3 is grounded through a resistor 7 and connected to the switch 13 through the series arrangement of the resistor 6 and the Zener diode 5 whose Zener voltage is located between the two possible values of the source voltage, i.e., between 12 and 24 V in the present instance. The base of the transistor 4 is grounded through a parallel arrangement of a resistor 9 and a capacitor 10, and is connected to the collector of the transistor 3 through a resistor 8. The circuit furthermore comprises two protective diodes 11 and 12 arranged at the terminals of the relay windings.

For a source voltage of 12 V, the diode 5 does not conduct and the transistor 3 is blocked; the resistance of the relay 1 being low in relation to that of the resistor 8, the transistor 4 is driven conductive and the relay 2 closes a switch 15 between the input H and the output A.

For a source voltage of 24 V the diode 5 conducts and the transistor 3 is saturated; the relay 1 closes a switch 14 between the input H and the output B; the transistor 4 is maintained in the blocked state by the resistors 8 and 9 and consequently the relay 2 is unenergized and keeps the switch 15 open.

All the circuits have been described on the assumption that the source has its negative terminal grounded; they can easily be modified to correspond with the case in which the positive terminal is grounded.

Other embodiments of the symmetrical converter according to the invention, may be derived: for example, although only a single rectifier circuit has been shown in FIG. 1, the converter can comprise several rectifier circuits in order to supply different direct voltages; these rectifier circuits can be connected either to intermediate taps on the autotransformer winding DF, or to additional secondary windings for which the winding DF acts as the primary of an ordinary transformer.

In the case where the two possible values of the source voltage are not in the ratio 2 but in some arbitrary other ratio, the emitters of the transistors $Q_3$ and $Q_4$ are not connected to the points C and E but to other intermediate taps symmetrical in relation to the centretap A and in such a fashion that the same voltage distribution is obtained along the winding DF for the two supply modes.

The intermediate taps are selected in the following manner:

$U_1$ and $U_2$ being respectively the voltages from the first and second supply sources, $V_o$ the voltage to be rectified, available between ground and, alternately, taps D and F of the autotransformer, S the saturation collector-emitter voltage of each one of the transistors, the following relations obtain $$(CA/CF) = (EA/ED) = (U_1 - S/V_o - S) \quad (1)$$

$$(CE'/CF) = (EC'/ED) = (U_2 - 2S/V_o - S) \quad (2)$$

Relation (1) define taps C and E, and relation (2) define taps C' and E'.

If $U_2 = 2 U_1$, this corresponding to the described embodiment, $$(CE'/CF) = (2 U_1 - 2S/V_o - S) = (2 CA/CF) = (CE/CF),$$

and E' coincides with E and, consequently C' with C.

In addition, while maintaining the arrangement of FIG. 1, the transistors can be arranged in a different although less advantageous fashion: for example, the transistors $Q_1$ and $Q_2$ can be connected to the primary winding by their collectors, by arranging for them to be of n-p-n type, this requiring the use of separate windings to control the bases of these transistors.

Of course, the invention is not limited to the embodiments described and shown which were given soleby by way of example.

What is claimed is:

1. A direct-direct symmetrical converter power pack having an input for being coupled to a supply source having a voltage having either one of two predetermined different absolute values and an output and comprising: a converter formed by a transformer having two end terminals, said transformer comprising a winding with a centre tap and further taps; at least one rectifier circuit coupled to said two end terminals of said transformer and comprising an output forming the output of said power pack, a switching circuit comprising first and second terminals, first, second, third and fourth transistors, each having a control electrode and first and second further electrodes, four biasing circuits respectively coupled to said control electrodes of said first, second, third and fourth transistors, said first further electrodes of said first and second transistors being coupled to said first terminal, and said second further electrodes of said first and second transistors being symmetrically coupled to said winding relatively to said centre-tap, said first further electrodes of said third and fourth transistors being coupled to said second terminal and said second further electrodes of said third and fourth transistor being symmetrically coupled to said winding relatively to said centre-tap, said first terminal and said centre-tap forming a first input of said converter, said first and second terminals forming a second input of said converter; and a selector device for connecting said input of said power pack either to said first input or to said second input of said converter depending upon the value of said voltage for maintaining at a constant value the voltage at said output of said power pack.

2. A power pack as claimed in claim 1, wherein one of said two predetermined absolute values of said voltage being half the other one, said second further electrodes of said first and third transistors are connected to a single one of said further taps.

3. A power pack as claimed in claim 1, wherein said first and second transistors are of one and the same type and said third and fourth transistors are of the type complementary to said one type, and wherein said first further electrode, said second further electrode and said control electrode of each of said transistors are respectively the collector, the emitter and the base thereof.

4. A power pack as claimed in claim 3, wherein each of said four biasing circuits comprises a parallel arrangement of a resistor and a capacitor, each arrangement being connected between the base of one of said transistors and said winding.

5. A power pack as claimed in claim 1, wherein said selector device is an automatic selector circuit comprising: a first switch between said input of said power pack and said first terminal; a second switch between said input of said power pack and said second terminal; and means coupled to said power pack input, and responsive to the voltage applied thereto, for controlling said switches.

* * * * *